United States Patent
Kim et al.

(10) Patent No.: US 7,872,700 B2
(45) Date of Patent: Jan. 18, 2011

(54) LIQUID CRYSTAL DISPLAY AND THIN FILM TRANSISTOR ARRAY PANEL THEREFOR

(75) Inventors: Dong-Gyu Kim, Yongin (KR); Sang-Soo Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 919 days.

(21) Appl. No.: 11/433,319

(22) Filed: May 12, 2006

(65) Prior Publication Data

US 2006/0203173 A1    Sep. 14, 2006

Related U.S. Application Data (62) Division of application No. 10/780,335, filed on Feb. 17, 2004, now Pat. No. 7,046,323.

(30) Foreign Application Priority Data

May 20, 2003    (KR) .............................. 2003-003841

(51) Int. Cl.
*G02F 1/136*    (2006.01)
*G02F 1/1337*    (2006.01)

(52) U.S. Cl. ......................................... 349/48; 349/129
(58) Field of Classification Search .................... 349/43, 349/46, 48, 129

See application file for complete search history.

(56) References Cited

U.S. PATENT DOCUMENTS

| | | | |
|---|---|---|---|
| 5,040,875 A * | 8/1991 | Noguchi ...................... 349/143 |
| 5,132,819 A | 7/1992 | Noriyama et al. | |
| 5,193,018 A * | 3/1993 | Wu .............................. 349/43 |
| 5,343,216 A | 8/1994 | Katayama et al. ............. 345/92 |
| 5,434,686 A * | 7/1995 | Kanemori et al. ............. 349/55 |
| 5,434,690 A | 7/1995 | Hisatake et al. ................ 349/8 |
| 6,278,503 B1 | 8/2001 | Nishikawa et al. | |
| 6,342,939 B1 | 1/2002 | Hirata et al. ................. 349/143 |
| 6,476,447 B1 | 11/2002 | Yamazaki et al. ........... 257/350 |
| 6,600,539 B2 | 7/2003 | Song ........................... 349/130 |
| 6,614,492 B1 | 9/2003 | Song ............................. 349/38 |
| 6,753,551 B2 | 6/2004 | Cheng .......................... 257/79 |
| 6,900,869 B1 | 5/2005 | Lee et al. ...................... 349/129 |
| 6,900,870 B2 | 5/2005 | Song ........................... 349/130 |
| 2001/0019388 A1 | 9/2001 | Kim et al. .................... 349/129 |
| 2002/0113929 A1 | 8/2002 | Yamazaki et al. | |
| 2002/0113931 A1 | 8/2002 | Park | |
| 2002/0118329 A1 | 8/2002 | Koma .......................... 349/130 |
| 2002/0145693 A1 | 10/2002 | Kim et al. .................... 349/129 |
| 2003/0053019 A1 | 3/2003 | Song et al. .................. 349/129 |

(Continued)

FOREIGN PATENT DOCUMENTS

CN    1105328    4/2003

(Continued)

Primary Examiner—James A Dudek
(74) Attorney, Agent, or Firm—F. Chau & Associates, LLC (57) ABSTRACT

A liquid crystal display includes a first substrate including a first electrode and a second electrode formed thereon, a second substrate including a third electrode formed thereon, wherein the second substrate is spaced apart from the first substrate by a gap, and at least one cutout formed in the third electrode, wherein the at least one cutout is aligned with a space between the first and second electrodes.

14 Claims, 4 Drawing Sheets

U.S. PATENT DOCUMENTS

2003/0210372 A1 11/2003 Song .......................... 349/130
2004/0080697 A1 4/2004 Song et al. ................. 349/130

FOREIGN PATENT DOCUMENTS

| | | |
|---|---|---|
| CN | 1420383 | 5/2003 |
| EP | 0 438 138 A2 | 7/1991 |
| EP | 1 462 846 A2 | 9/2004 |
| KR | 1999-026575 | 4/1999 |
| KR | 10-20000035709 A | 6/2000 |
| TW | 543199 | 7/2003 |
| WO | WO 03/044592 A1 | 5/2003 |

* cited by examiner

LIQUID CRYSTAL DISPLAY AND THIN FILM TRANSISTOR ARRAY PANEL THEREFOR

CROSS-REFERENCE TO RELATED APPLICATIONS

This application is a Divisional of U.S. application Ser. No. 10/780,335, filed on Feb. 17, 2004, now U.S. Pat. No. 7,046,323, the disclosure of which is hereby incorporated by reference herein in its entirety.

BACKGROUND OF THE INVENTION

1. Technical Field

The present disclosure relates to a liquid crystal display and a thin film transistor array panel therefore.

2. Discussion of the Related Art

A liquid crystal display (LCD) is one of the most widely used flat panel displays. LCDs are used in notebook or laptop computers, desktop computer monitors and televisions. LCDs are lightweight and occupy less space than conventional cathode ray tube (CRT) displays.

The general structure of an LCD consists of a liquid crystal (LC) layer that is positioned between pair of panels including field generating electrodes and polarizers. The LC layer is subject to an electric field generated by the electrodes and variations in the field strength change the molecular orientation of the LC layer. For example, upon application of an electric field, the molecules of the LC layer change their orientation and polarize light passing through the LC layer. Appropriately positioned polarized filters block the polarized light, creating dark areas that can represent desired images.

One measure of LCD quality is viewing angle (i.e., the available area when viewing the LCD in which minimum contrast can be seen). Various techniques for enlarging the viewing angle have been suggested, including a technique utilizing a vertically aligned LC layer and providing cutouts or protrusions at pixel electrodes. However, cutouts and the protrusions reduce the aperture ratio (i.e., ratio between the actual size of a sub-pixel and the area of the sub-pixel that can transmit light). To increase aperture ratio, it has been suggested that the size of the pixel electrodes be maximized. However, maximization of the size of the pixel electrodes results in a close distance between the pixel electrodes, causing strong lateral electric fields between the pixel electrodes. The strong electric fields cause unwanted altering of the orientation of the LC molecules, yielding textures and light leakage and deteriorating display characteristics.

Another issue arises with the photo etching processes performed to form various patterns on the panels of the LCD. When a backplane for LCDs is too large to use an exposure mask, the entire exposure (e.g., irradiation of a resist) is accomplished by repeating a divisional exposure. This is called a step-and-repeat process and a single exposure area or field is called a shot. One characteristic associated with the step-and-repeat process is that the shots may be misaligned due to transition, rotation, distortion, etc., which are generated during light exposure. Accordingly, parasitic capacitances generated between wires and pixel electrodes differ depending on the shots in which they are located. These capacitance differences cause a brightness difference between the shots, which is recognized at the pixels located at a boundary between the shots. As a result, a stitch defect is generated on the screen of the LCD due to the brightness discontinuity between the shots.

Therefore, there exists a need in the art for an LCD panel and cutout configuration that allows for increased viewing angle without causing an unwanted reduction in aperture ratio and distortion of the orientation of the LC layer. There also exists a need for an LCD panel configuration that minimizes or eliminates parasitic capacitance differences between shots and corresponding brightness discontinuity.

SUMMARY OF THE INVENTION

A liquid crystal display, in accordance with an embodiment of the present invention, includes a first substrate including a first electrode and a second electrode formed thereon, a second substrate including a third electrode formed thereon, wherein the second substrate is spaced apart from the first substrate by a gap, and at least one cutout formed in the third electrode, wherein the at least one cutout is aligned with a space between the first and second electrodes.

The first electrode may be a first pixel electrode, the second electrode may be a second pixel electrode and the third electrode may be a common electrode. The gap may include a liquid crystal layer configured for housing liquid crystal molecules, and the at least one cutout may include a first edge aligned parallel to an edge of the first electrode and a second edge aligned parallel to an edge of the second electrode. A component of an electric field generated between the third and the first and second electrodes for causing a change in tilt direction of the liquid crystal molecules may align at least one of perpendicular to the first edge of the cutout, perpendicular to the second edge of the cutout, perpendicular to the edge of the first electrode and perpendicular to the edge of the second electrode. The at least one cutout may have a width within the range of about 9 to about 12 microns.

The liquid crystal display may further include a plurality of data lines for transmitting data voltages formed on the first substrate, and at least one other cutout formed in the third electrode, wherein the at least one other cutout is aligned with at least one data line of the plurality of data lines.

An electric field, due to a voltage difference between the first electrode and the second electrode, may be generated between the first and second electrodes, and a direction of the electric field may be at least one of perpendicular to the first edge of the at least one cutout and perpendicular to the second edge of the at least one cutout. A voltage having an opposite polarity with respect to a voltage applied to the third electrode may be applied to one of the first electrode and the second electrode The liquid crystal display may further include at least one gate electrode formed on the first substrate, and at least two transistors formed on the first substrate and symmetrically disposed about the at least one gate electrode for creating a non-varying parasitic capacitance between the at least one gate electrode and at least two drain electrodes of the at least two transistors across a plurality of shots of the first substrate. A pair of the symmetrically disposed transistors may include the at least one gate electrode, at least one source electrode, the at least two drain electrodes and at least one semiconductor island. The liquid crystal display may further include a plurality of data lines for transmitting data voltages formed on the first substrate, wherein the first and second electrodes are symmetrically disposed about at least one data line of the plurality of data lines for creating a non-varying parasitic capacitance between the first and second electrodes and the at least one data line across a plurality of shots of the first substrate.

The liquid crystal display may further include a plurality of gate lines for transmitting gate signals formed on the first substrate, a plurality of storage electrode lines for transmitting at least one predetermined voltage formed on the first substrate, and a plurality of data lines for transmitting data voltages formed on the first substrate. At least one of the first electrode and the second electrode may be positioned in an area enclosed by the plurality of gate lines, the plurality of storage electrode lines and the plurality of data lines, and may overlap at least one data line of the plurality of data lines. The plurality of data lines may intersect the plurality of gate lines and the plurality of storage lines. Each data line of the plurality of data lines may be curved and include a plurality of pairs of oblique portions connected to each other to form a chevron. Opposite ends of the oblique portions may be connected to respective longitudinal portions that cross over gate electrodes. A length of each pair of the oblique portions may be about one to about nine times a length of a longitudinal portion. At least one of the plurality of gate lines, the plurality of storage electrode lines and the plurality of data lines may include tapered sides, wherein an incline angle of the tapered sides with respect to a horizontal surface of the first substrate is within the range of about 30 to about 80 degrees. At least one of the plurality of gate lines, the plurality of storage electrode lines and the plurality of data lines includes a lower film and an upper film, wherein the upper film includes one of aluminum and an aluminum alloy and the lower film includes one of chromium, molybdenum and a molybdenum alloy.

The liquid crystal display may further include a plurality of storage electrodes formed on the first substrate, and a plurality of drain electrodes formed on the first substrate, wherein at least one pair of drain electrodes of the plurality of drain electrodes overlaps at least one pair of storage electrodes of the plurality of storage electrodes. The first electrode and the second electrode may be respectively connected to a first drain electrode and a second drain electrode of the plurality of drain electrodes, and the first electrode and the second electrode may receive data voltages from the first drain electrode and the second drain electrode, respectively. The liquid crystal display may also include a plurality of color filters formed on one of the first substrate and the second substrate, wherein two adjacent color filters of the plurality of color filters overlap each other.

The liquid crystal display may further include a gate insulating layer formed on the first substrate, a plurality of semiconductor islands formed on the gate insulating layer, a plurality of ohmic contacts formed on the semiconductor islands, a plurality of data lines for transmitting data voltages formed on at least one of the ohmic contacts and the gate insulating layer, and a plurality of drain electrodes formed on the ohmic contacts, wherein the semiconductor islands have essentially the same planar shapes as at least one of the data lines, the drain electrodes and the ohmic contacts. The data lines, the drain electrodes, the semiconductor islands and the ohmic contacts may be simultaneously formed using one photolithography process.

Another liquid crystal display, in accordance with an embodiment of the present invention, includes a first substrate including a first electrode and a second electrode formed thereon, a second substrate including a third electrode formed thereon, wherein the second substrate is spaced apart from the first substrate by a gap, at least one gate electrode formed on the first substrate, and at least two transistors formed on the first substrate and symmetrically disposed about the at least one gate electrode.

The first electrode may be a first pixel electrode, the second electrode may be a second pixel electrode and the third electrode may be a common electrode. A pair of the symmetrically disposed transistors may include the at least one gate electrode, at least one source electrode, at least two drain electrodes and at least one semiconductor island. A plurality of data lines for transmitting data voltages may be formed on the first substrate, wherein the first and second electrodes are symmetrically disposed about at least one data line of the plurality of data lines.

At least one cutout may be formed in the third electrode, wherein the at least one cutout includes a first edge aligned parallel to an edge of the first electrode and a second edge aligned parallel to an edge of the second electrode. The at least one cutout may be aligned with a space between the first and second electrodes. A component of an electric field generated between the third and the first and second electrodes for causing a change in tilt direction of liquid crystal molecules may align at least one of perpendicular to the first edge of the cutout, perpendicular to the second edge of the cutout, perpendicular to the edge of the first electrode and perpendicular to the edge of the second electrode. The at least one cutout may have width within the range of about 9 to about 12 microns. An electric field may be generated between the first and second electrodes, and a direction of the electric field may be at least one of perpendicular to the first edge of the at least one cutout and perpendicular to the second edge of the at least one cutout.

The liquid crystal display may further include a plurality of data lines for transmitting data voltages formed on the first substrate, and at least one cutout formed in the third electrode, wherein the at least one cutout is aligned with the at least one data line. A voltage having an opposite polarity with respect to a voltage applied to the third electrode may be applied to one of the first electrode and the second electrode. An electric field, due to a voltage difference between the first electrode and the second electrode, may be generated between the first electrode and the second electrode.

Another liquid crystal display, in accordance with an embodiment of the present invention, includes a first substrate including a first pixel electrode and a second pixel electrode formed thereon. And a second substrate including a common electrode formed thereon, wherein the second substrate is spaced apart from the first substrate by a gap, and a voltage having an opposite polarity with respect to a voltage applied to the common electrode is applied to one of the first pixel electrode and the second pixel electrode to generate an electric field between the first pixel electrode and the second pixel electrode having a direction which coincides with a component of an electric field generated between the common electrode and the first and second pixel electrodes.

Another liquid crystal display, in accordance with an embodiment of the present invention, includes a first substrate including a first electrode and a second electrode formed thereon, a second substrate including a third electrode formed thereon, wherein the second substrate is spaced apart from the first substrate by a gap, and at least one cutout formed in the third electrode, wherein the at least one cutout includes a first edge aligned parallel to an edge of the first electrode and a second edge aligned parallel to an edge of the second electrode.

Another liquid crystal display, in accordance with an embodiment of the present invention, includes a first substrate including a first electrode and a second electrode formed thereon, a second substrate including a third electrode formed thereon, wherein the second substrate is spaced apart from the first substrate by a gap, and a plurality of data lines for transmitting data voltages formed on the first substrate, wherein the first and second electrodes are symmetrically disposed about at least one data line of the plurality of data lines.

BRIEF DESCRIPTION OF THE DRAWINGS

Preferred embodiments of the invention can be understood in more detail from the following descriptions taken in conjunction with the accompanying drawings in which.

DETAILED DESCRIPTION OF PREFERRED EMBODIMENTS

Preferred embodiments of the present invention will be described below in more detail with reference to the accompanying drawings. This invention may, however, be embodied in different forms and should not be construed as limited to the embodiments set forth herein.

Figure 1:
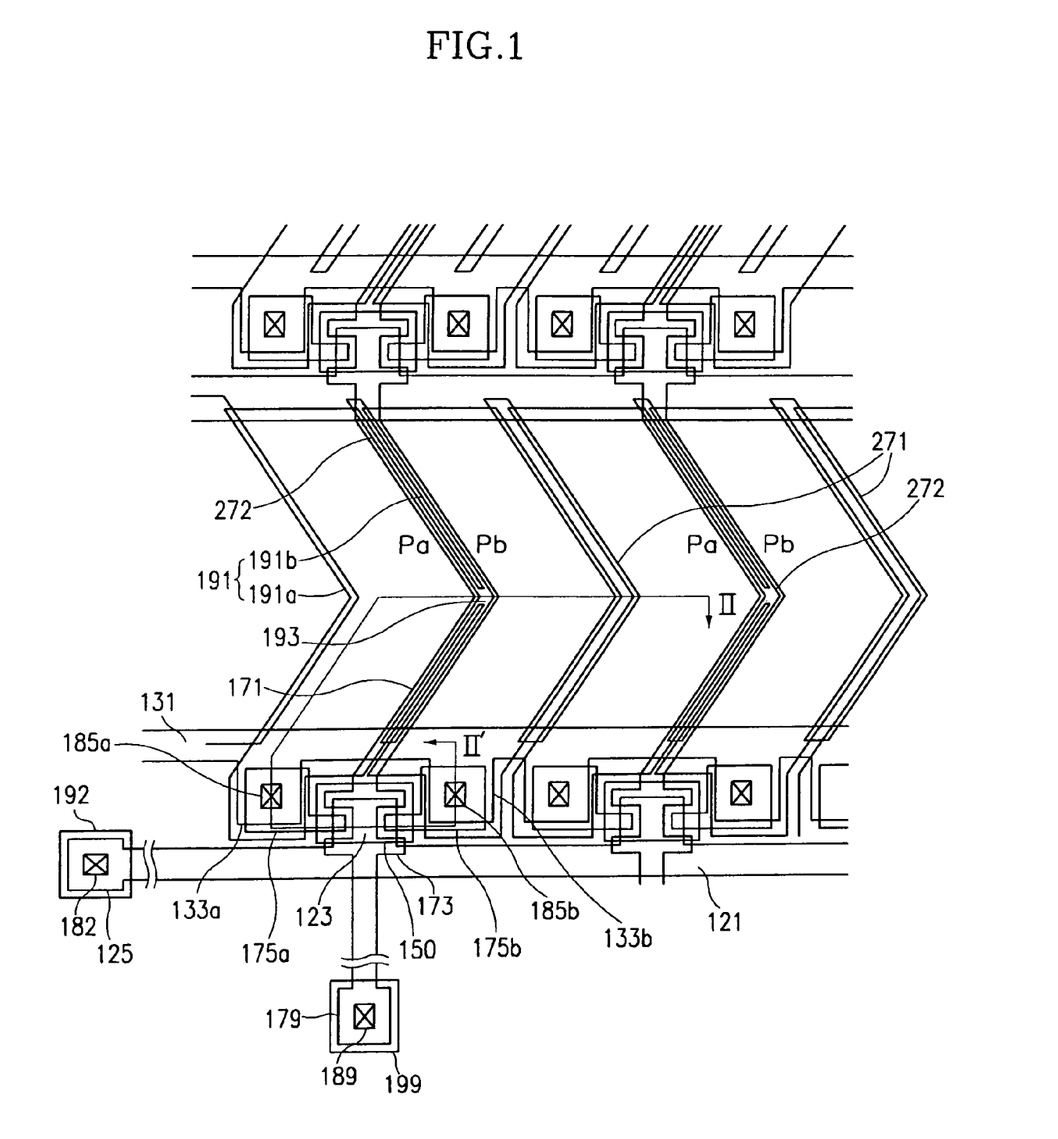
FIG. 1 is a layout view of an LCD according to an embodiment of the present invention.
Figure 2:
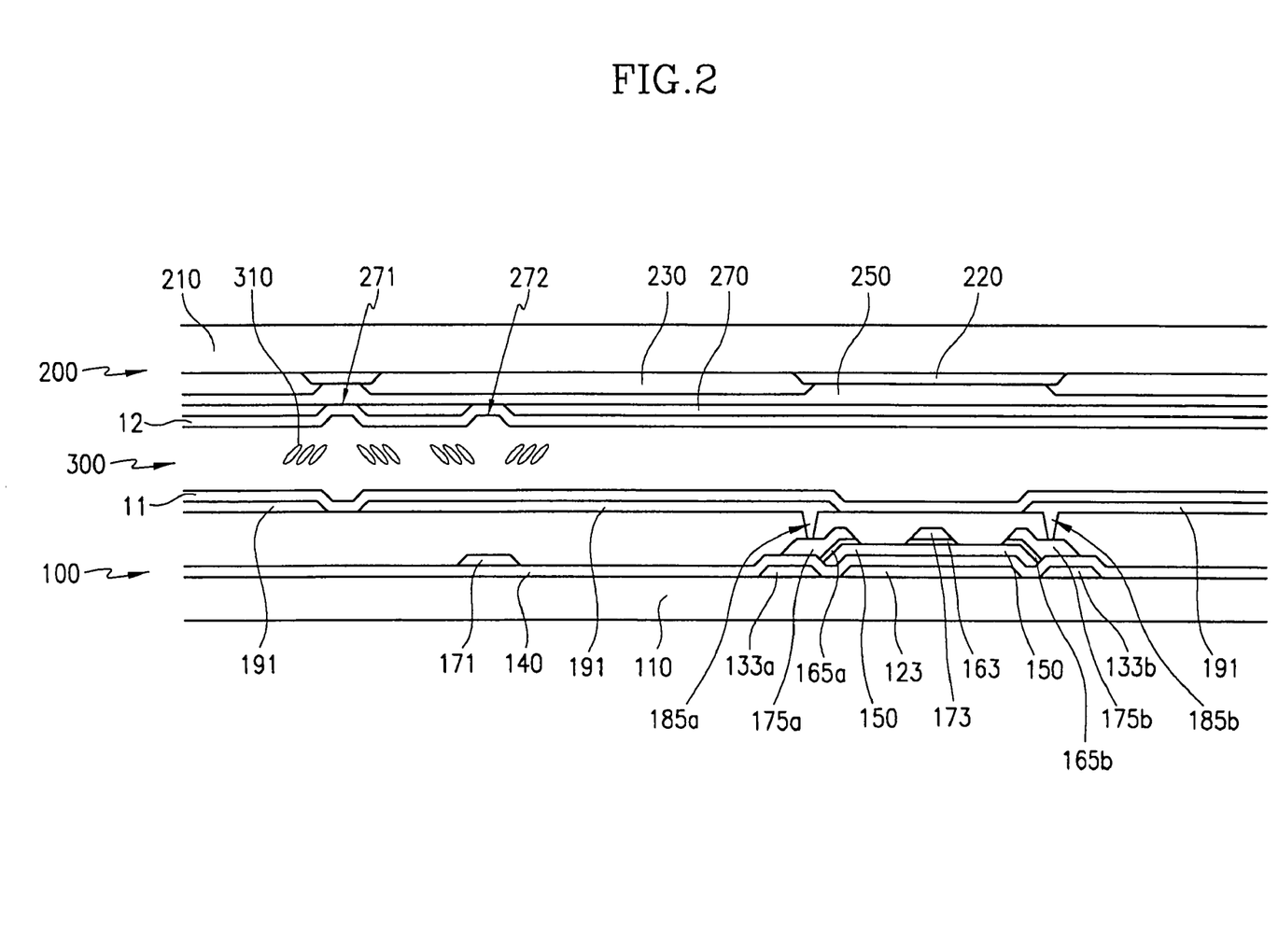
FIG. 2 is a sectional view of the LCD shown in FIG. 1 taken along the line II-II'.

FIG. 1 is a layout view of an LCD according to an embodiment of the present invention, and FIG. 2 is a sectional view of the LCD shown in FIG. 1 taken along the line II-II'.

As shown in FIG. 2, an LCD according to an embodiment of the present invention includes a TFT array panel 100, a common electrode panel 200, and an LC layer 300 interposed between the panels 100 and 200 and containing a plurality of LC molecules 310 aligned in the vertical direction with respect to the surfaces of the panels 100 and 200.

Referring to FIGS. 1 and 2, a plurality of gate lines 121 and a plurality of storage electrode lines 131 are formed on an insulating substrate 110. The gate lines 121 are separated from each other and extend substantially in a transverse direction. The gate lines 121 transmit gate signals and a plurality of projections of each gate line 121 form a plurality of gate electrodes 123.

Each storage electrode line 131 extends substantially in the transverse direction and includes a plurality of projections forming a plurality of pairs of storage electrodes 133a and 133b. The storage electrodes 133a and 133b have a shape of rectangle (or diamond) and are located close to the gate electrodes 123. The storage electrode lines 131 are supplied with a predetermined voltage such as a common voltage, which is applied to a common electrode 270 on the common electrode panel 200 of the LCD.

The gate lines 121 and the storage electrode lines 131 may have a multi-layered structure including two films having different physical characteristics, a lower film (not shown) and an upper film (not shown). The upper film is preferably made of a metal having a low resistivity, for example, an aluminum (Al) containing metal such as Al or an Al alloy, for reducing signal delay or voltage drop in the gate lines 121 and the storage electrode lines 131. The lower film is preferably made of a material such as chromium (Cr), molybdenum (Mo) or a Mo alloy, which has good contact characteristics with other materials such as indium tin oxide (ITO) or indium zinc oxide (IZO). A preferred combination of the lower film material and the upper film material is Cr and an aluminum-neodymium (Al—Nd) alloy, respectively.

The sides of the gate lines 121 and the storage electrode lines 131 are tapered, and the angle of incline of the sides with respect to a surface of the substrate 110 ranges from about 30 to about 80 degrees.

A gate insulating layer 140 preferably made of silicon nitride (SiNx) is formed on the gate lines 121 and the storage electrode lines 131.

A plurality of semiconductor islands 150 preferably made of hydrogenated amorphous silicon (a-Si) or polysilicon (p-Si) are formed on the gate insulating layer 140. Each semiconductor island 150 is located opposite a gate electrode 123.

A plurality of ohmic contact islands 163, 165a and 165b preferably made of silicide or n+ hydrogenated a-Si heavily doped with an n-type impurity are formed on the semiconductor islands 150.

The sides of the semiconductor islands 150 and the ohmic contacts 163, 165a and 165b are tapered, and the incline angles thereof with respect to the substrate 110 are preferably in a range between about 30 to about 80 degrees.

As shown in FIG. 1, a plurality of data lines 171 for transmitting data voltages extend substantially in the longitudinal direction and intersect the gate lines 121 and the storage electrode lines 131. Each data line 171 is curved repeatedly and includes a plurality of pairs of oblique portions and a plurality of longitudinal portions. A pair of oblique portions are connected to each other to form a chevron and opposite ends of the pair of oblique portions are connected to respective longitudinal portions. The oblique portions of the data lines 171 form an angle of about 45 degrees with the gate lines 121, and the longitudinal portions cross over the gate electrodes 123. The length of a pair of oblique portions is about one to about nine times the length of a longitudinal portion, that is, it occupies about 50 to about 90 percent of the total length of the pair of oblique portions plus the longitudinal portion.

As shown in FIG. 2, the plurality of data lines 171 and a plurality of pairs of drain electrodes 175a and 175b are separated from each other and formed on the ohmic contacts 163, 165a and 165b and the gate insulating layer 140.

The pair of drain electrodes 175a and 175b are opposite each other with respect to a longitudinal portion of a data line 171. Each longitudinal portion of the data lines 171 includes a plurality of projections such that the longitudinal portion including the projections forms a source electrode 173 partly enclosing the drain electrodes 175a and 175b. The source electrode 173 is formed on the ohmic contact 163. The drain electrodes 175a and 175b are formed on the ohmic contacts 165a and 165b, respectively.

The ohmic contacts 163, 165a and 165b are interposed only between the underlying semiconductor islands 150 and the overlying data lines 171 and the overlying source and drain electrodes 173, 175a and 175b and reduce the contact resistance between the underlying and overlying elements. Each drain electrode 175a or 175b includes an expansion overlapping a storage electrode 133a or 133b.

Each set of a gate electrode 123, a source electrode 173, a pair of drain electrodes 175a and 175b, and a semiconductor island 150 form a pair of TFTs. The pair of TFTs includes channels formed in the semiconductor island 150 disposed between the source electrode 173 and the drain electrodes 175a and 175b, respectively.

Like the gate lines 121 and the storage electrode lines 131, the data lines 171 and the drain electrodes 175a and 175b may also include a lower film (not shown) preferably made of Mo, Mo alloy or Cr and an upper film (not shown) located thereon, preferably made of an Al containing metal. Further, the data lines 171 and the drain electrodes 175a and 175b also have tapered sides, with incline angles ranging from about 30 to about 80 degrees.

A passivation layer 180 is formed on the data lines 171, the drain electrodes 175a and 175b, and exposed portions of the semiconductor islands 150 which are not covered by the data lines 171 and the drain electrodes 175a and 175b. The passivation layer 180 is preferably made of a flat photosensitive organic material and low dielectric insulating material such as a-Si:C:O and a-Si:O:F formed by plasma enhanced chemical vapor deposition (PECVD), or an inorganic material such as silicon nitride and silicon oxide. The passivation layer 180 may have a double-layered structure including a lower inorganic film and an upper organic film.

The passivation layer 180 has a plurality of contact holes 185a, 185b and 189 exposing the drain electrodes 175a and 175b and end portions 179 of the data lines 171, respectively. The passivation layer 180 and the gate insulating layer 140 have a plurality of contact holes 182 exposing end portions 125 of the gate lines 121. The contact holes 182, 185a, 185b and 189 can have various shapes, such as a polygon or circle. The area of each contact hole 182 or 189 is preferably greater than or equal to 0.5 mm×15 µm and not larger than 2 mm×60 µm. The sidewalls of the contact holes 182, 185a, 185b and 189 are inclined with an angle of about 30 to about 85 degrees or have stepwise profiles.

A plurality of pairs of pixel electrodes 191a and 191b and a plurality of contact assistants 192 and 199, which are preferably made of ITO, IZO or Cr, are formed on the passivation layer 180.

Each pixel electrode 191a or 191b is located substantially in an area enclosed by the data lines 171, the gate lines 121, and the storage electrode lines 131 and forms a chevron. A pair of pixel electrodes 191a and 191b are connected to each other through a connection 193 and form a pair of subpixel areas Pa and Pb.

The pixel electrodes 191a and 191b are physically and electrically connected to the drain electrodes 175a and 175b through the contact holes 185a and 185b such that the pixel electrodes 191a and 191b receive the data voltages from the drain electrodes 175a and 175b. The pixel electrodes 191a and 191b supplied with the data voltages generate electric fields in cooperation with the common electrode 270, which reorient liquid crystal molecules disposed therebetween.

A pixel electrode 191a or 191b and a common electrode form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitor is implemented by overlapping the pixel electrodes 191 with the storage electrode lines 131. The capacitance of a storage capacitor, (i.e., the storage capacitance) is increased by providing the projections at the storage electrode lines 131 forming the storage electrodes 133a and 133b, elongating the drain electrodes 175a and 175b connected to the pixel electrodes 191a and 191b, and providing the expansions at the drain electrodes 175a and 175b overlapping the storage electrodes 133a and 133b of the storage electrode lines 131. These design elements decrease the distance between the terminals and increase the overlapping areas, resulting in an increase of the storage capacitance. The pixel electrodes 191a and 191b also may overlap the data lines 171 to increase aperture ratio.

The contact assistants 192 and 199 are connected to the exposed end portions 125 of the gate lines 121 and the exposed end portions 179 of the data lines 171 through the contact holes 182 and 189, respectively. The contact assistants 192 and 199 are not required, but are preferred to protect the exposed portions 125 and 179 and to complement the adhesiveness of the exposed portions 125 and 179 and external devices.

An alignment layer 11 is formed on the pixel electrodes 191a and 191b, the contact assistants 192 and 199, and the passivation layer 180.

With respect to the common electrode panel 200, a black matrix 220 for preventing light leakage is formed on an insulating substrate 210 such as transparent glass. The black matrix 220 includes a plurality of openings facing the pixel electrodes 191a and 191b and having substantially the same shape as the pixel electrodes 191a and 191b.

A plurality of red, green and blue color filters 230 are formed with a substantial portion thereof in the openings of the black matrix 220 and an overcoat 250 is formed on the color filters 230.

A common electrode 270 preferably made of transparent conductive material such as ITO and IZO is formed on the overcoat 250. The common electrode 270 has a plurality of cutouts 271 and 272. Each cutout 271 is aligned with a gap between a pair of pixel electrodes 191a and 191b and has two main edges parallel to the two opposite edges of the pair of pixel electrodes 191a and 191b. As shown, the cutouts 271 may overlap the edges of the pixel electrodes 191a and 191b. The cutouts 271 are provided for controlling the tilt directions of the LC molecules in the LC layer 300 and preferably have a width in a range between about 9 to about 12 microns. End portions of the cutouts 271 may have various shapes. The cutouts 272 are aligned with the data lines 171 and are provided for reducing the delay of the data voltages flowing in the data lines 171. The delay is generated by the parasitic capacitance formed by the overlap of the common electrode 270 and the data lines 171. The cutouts 272 are also used for controlling the tilt directions of the LC molecules of the LC layer 300.

A homogeneous or homeotropic alignment layer 12 is coated on the common electrode 270.

A pair of polarizers (not shown) are provided on the outer surfaces of the panels 100 and 200 such that their transmissive axes are crossed and one of the transmissive axes is parallel to the gate lines 121.

The LCD may further include at least one retardation film (e.g., an optical element that produces, for example, full, half or quarter wave phase changes of polarized light) for compensating for the retardation of the LC layer 300.

The LC molecules in the LC layer 300 are aligned such that their long axes are vertical to the surfaces of the panels 100 and 200. The liquid crystal layer 300 has negative dielectric anisotropy.

Upon application of a common voltage to the common electrode 270 and a data voltage to the pixel electrodes 191a and 191b, a primary electric field substantially perpendicular to the surfaces of the panels 100 and 200 is generated. The LC molecules tend to change their orientations in response to the electric field such that their long axes are perpendicular to the field direction.

The cutouts 271 of the common electrode 270 and the edges of the pixel electrodes 191a and 191b distort the primary electric field to have a horizontal component which determines the tilt directions of the LC molecules. The horizontal component of the primary electric field adopts four different orientations, thereby forming four domains in the LC layer 300 with different LC molecule tilt directions. The horizontal component is perpendicular to the first and second edges of the cutouts 271, perpendicular to the edge of the pixel electrode 191a and perpendicular to the edge of the pixel electrode 191b. Accordingly, four domains having different tilt directions are formed in the LC layer 300. The cutouts 271 may be substituted with a plurality of protrusions formed on the common electrode 270 since the tilt directions of the LC molecules also can be controlled by a plurality of protrusions (not shown).

The directions of a secondary electric field due to the voltage difference between the pixel electrodes 191a and 191b are perpendicular to each of the edges of the cutouts 271. Accordingly, the field direction of the secondary electric field coincides with that of the horizontal component of the primary electric field. Consequently, the secondary electric field between the pixel electrodes 191a and 191b enhances the tilt directions of the LC molecules.

Since the LCD performs inversion (i.e., inverting the polarity of an applied voltage) such as dot inversion, column inversion, etc., a secondary electric field that enhances the tilt directions of the LC molecules is attained by supplying an adjacent pixel electrode with a data voltage having opposite polarity with respect to the common voltage. As a result, a direction of the secondary electric field generated between adjacent pixel electrodes is equivalent to the horizontal component of the primary electric field generated between the common and pixel electrodes. Thus, a secondary electric field between the adjacent pixel electrodes can be generated to enhance the stability of the domains.

The tilt directions of all the domains form an angle of about 45 degrees with the gate lines 121, and the gate lines 121 are parallel to or perpendicular to the edges of the panels 100 and 200. Since a 45-degree intersection of the tilt directions and transmissive axes of the polarizers results in maximum transmittance, the polarizers can be attached such that the transmissive axes of the polarizers are parallel or perpendicular to the edges of the panels 100 and 200, thereby reducing the production cost.

Referring to FIGS. 1 and 2, the symmetrical alignment of the pair of TFTs and the pair of pixel electrodes 191a and 191b about the gate electrode 123 and the data line 171, respectively, creates constant parasitic capacitances between the data line 171 and the pixel electrodes 191a, 191b and between the gate electrode 123 and the drain electrodes 175a, 175b. As a result, brightness differences between shots are reduced.

It should be noted that increased resistance of the data lines 171 due to their curved structure can be compensated for by widening the data lines 171. Further, distortion of the electric field and increase of the parasitic capacitance due to increases in width of the data lines 171 can, in turn, be compensated for by increasing the size of the pixel electrodes 191a and 191b and by adapting a thick organic passivation layer.

In a method of manufacturing the TFT array panel shown in FIGS. 1 and 2, a plurality of gate lines 121 including a plurality of gate electrodes 123 and a plurality of storage electrode lines 131 including a plurality of storage electrodes 133a and 133b are formed on an insulating substrate 110 such as transparent glass.

If the gate lines 121 and the storage electrode lines 131 have a double-layered structure including a lower conductive film and an upper conductive film, the lower conductive film is preferably made of material such as a Cr or Mo alloy having good physical and chemical characteristics and the upper conductive film is preferably made of Al or an Al containing metal.

After sequential deposition of a gate insulating layer 140 having a thickness of about 1,500 to about 5,000 Å, an intrinsic a-Si layer with a thickness of about 500 to about 2,000 Å, and an extrinsic a-Si layer with a thickness of about 300 to about 600 Å, are photo-etched to form a plurality of extrinsic semiconductor islands and a plurality of intrinsic semiconductor islands 150 on the gate insulating layer 140.

Subsequently, a plurality of data lines 171 including a plurality of source electrodes 173 and a plurality of drain electrodes 175a and 175b are formed.

Thereafter, portions of the extrinsic semiconductor islands, which are not covered with the data lines 171 and the drain electrodes 175a and 175b, are removed to complete a plurality of ohmic contact islands 163 and 165 and to expose portions of the intrinsic semiconductor islands 150. Oxygen plasma treatment preferably follows thereafter in order to stabilize the exposed surfaces of the semiconductor islands 150.

A passivation layer 180 is formed of a photosensitive organic insulating material such as acryl-based material and is deposited on the existing structure. After depositing the passivation layer 180, the passivation layer 180 and the gate insulating layer 140 are patterned to form a plurality of contact holes 182, 185a, 185b and 189 exposing end portions 125 of the gate lines 121, the drain electrodes 175a and 17bb, and end portions 179 of the data lines 171, respectively.

Finally, a plurality of pixel electrodes 191a and 191b and a plurality of contact assistants 192 and 199 are formed on the passivation layer 180 by sputtering and photo-etching an IZO or ITO layer with a thickness of about 400 to about 500 Å.

Figure 3:
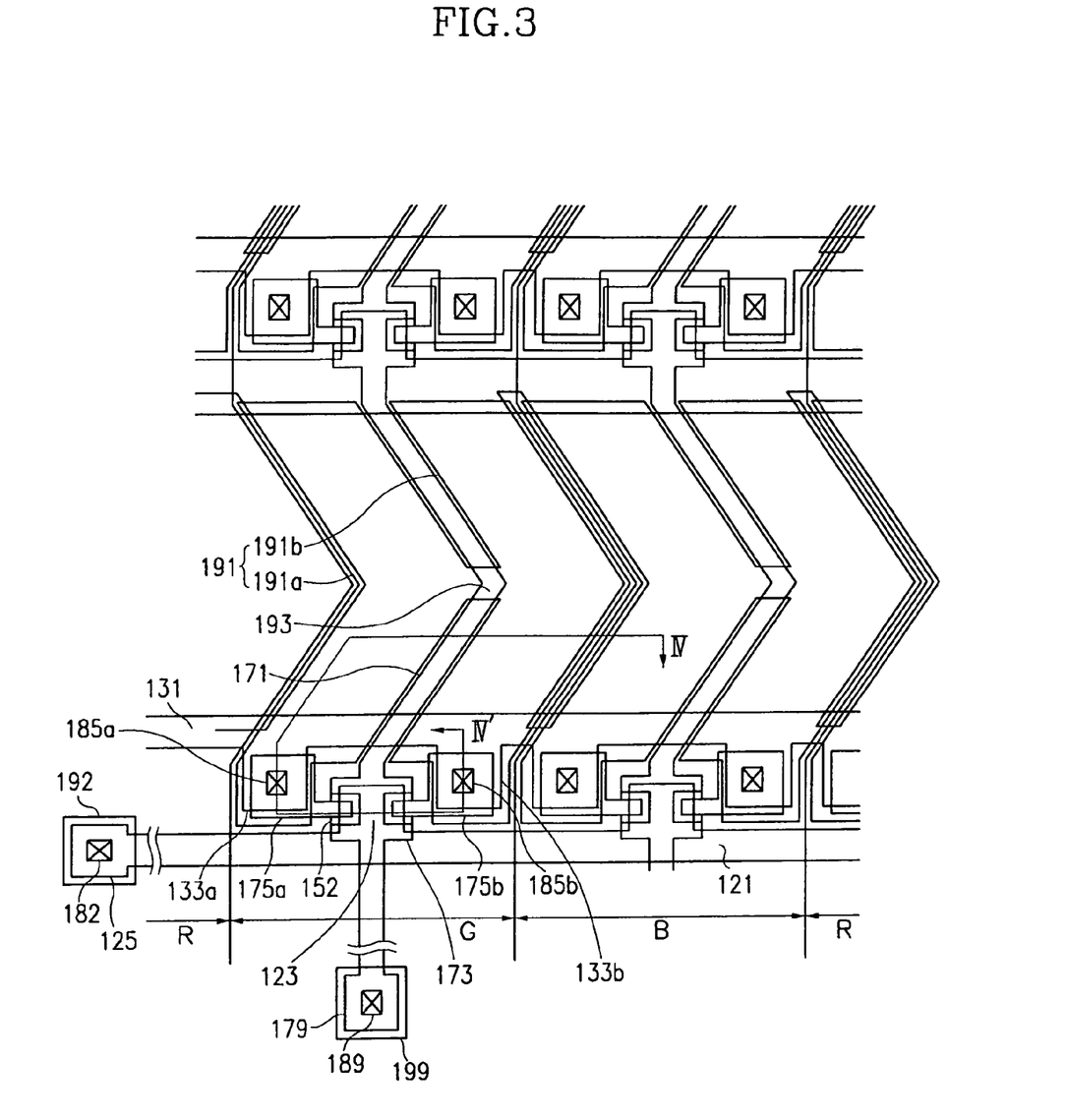
FIG. 3 is a layout view of an LCD according to another embodiment of the present invention.
Figure 4:
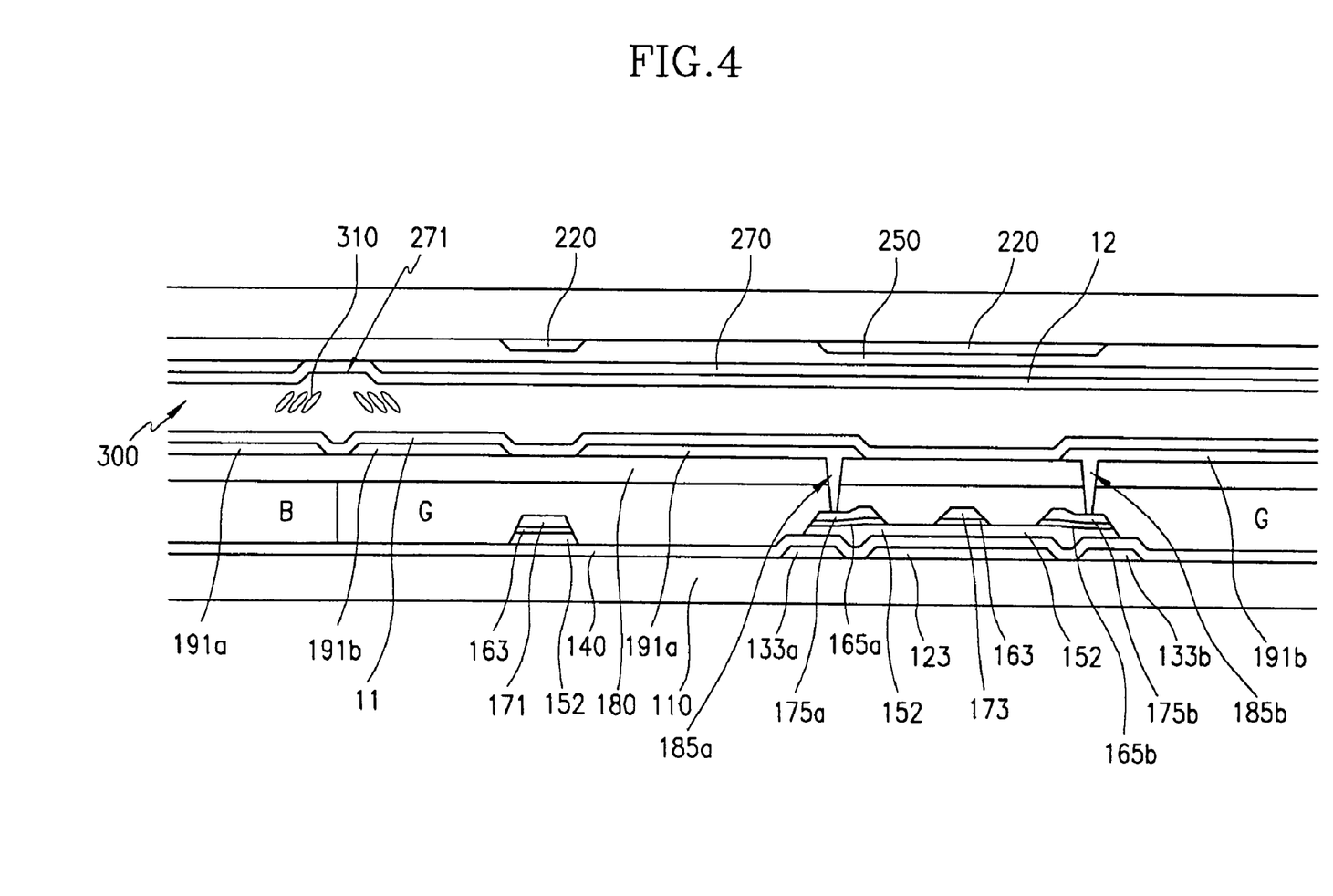
FIG. 4 is a sectional view of the LCD shown in FIG. 3 taken along the line IV-VI'.

FIG. 3 is a layout view of an LCD according to another embodiment of the present invention, and FIG. 4 is a sectional view of the LCD shown in FIG. 3 taken along the line IV-VI'.

As shown in FIGS. 3 and 4, a layered structure of a TFT array panel of an LCD according to this embodiment includes some of the same elements as shown in FIGS. 1 and 2. In the configuration shown in FIGS. 3 and 4, a plurality of gate lines 121 including a plurality of gate electrodes 123 and a plurality of storage electrodes lines 131 including a plurality of storage electrodes 133a and 133b are formed on a substrate 110. A gate insulating layer 140, a plurality of semiconductor stripes 152, and a plurality of ohmic contact stripes and islands 163 and 165 are sequentially formed on the substrate 110 including the gate lines 121, gate electrodes 123, storage electrode lines 131 and storage electrodes 133a, 133b. A plurality of data lines 171 including a plurality of source electrodes 173 and a plurality of drain electrodes 175a and 175b are formed on the ohmic contacts 163 and 165, and a passivation layer 180 and an alignment layer 11 are sequentially formed thereon. A plurality of contact holes 182, 185a, 185b and 189 are provided in the passivation layer 180 and/or the gate insulating layer 140, and a plurality of pixel electrodes 191a and 191b and a plurality of contact assistants 192 and 199 are formed on the passivation layer 180.

A layered structure of a common electrode panel of the LCD according to the embodiment shown in FIG. 4 includes some of the same elements as shown in FIGS. 1 and 2. For example, a black matrix 220, an overcoat 250, and a common electrode 270 as well as an alignment layer 21 are sequentially formed on an insulating substrate 210.

As distinguished from the TFT array panel shown in FIGS. 1 and 2, the TFT array panel according to the embodiment shown in FIGS. 3 and 4 extends the semiconductor stripes 152 and the ohmic contacts 163 along the data lines 171. Also, the semiconductor stripes 152 have almost the same planar shapes as the data lines 171 and the drain electrodes 175a and 175b as well as the underlying ohmic contacts 163 and 165, except for channel portions of the TFTs.

Also unlike the LCD of FIGS. 1 and 2, a plurality of red, green and blue color filters R, G and B are formed under the passivation layer 180 opposite the pixel electrodes 191a and 191b, and there is no color filter on the upper panel 200. Further, the contact holes 185a and 185b penetrate the color filters R, G and B. Two adjacent color filters of the color filters R, G and B may overlap each other to enhance the prevention of light leakage.

A manufacturing method of the TFT array panel according to an embodiment of the present invention simultaneously forms the data lines 171, the drain electrodes 175a and 175b, the semiconductor stripes 152, and the ohmic contacts 163 and 165 using one photolithography process. A photoresist pattern for the photolithography process has position-dependent thickness, and in particular, it has portions with smaller thickness located on the channels of TFTs. Therefore, additional photolithography processes can be omitted to simplify the manufacturing process.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. liquid crystal display, comprising:
   a first substrate including a pixel electrode having a first portion and a second portion formed thereon;
   a second substrate including a common electrode formed thereon, wherein the second substrate is spaced apart from the first substrate by a gap;
   at least one data line formed on the first substrate; and
   at least two transistors formed on the first substrate,
   wherein the first portion and the second portion are connected to the at least two transistors, respectively, and
   wherein the first portion and the second portion are connected to each other.

2. The liquid crystal display as recited in claim 1, wherein the transistors are symmetrically disposed with respect to a data line direction.

3. The liquid crystal display as recited in claim 2, wherein a pair of the transistors includes the at least one gate electrode, at least one source electrode, at least two drain electrodes and at least one semiconductor island.

4. The liquid crystal display as recited in claim 2, wherein the data line is interposed between the first and second portions of the pixel.

5. The liquid crystal display as recited in claim 4, wherein the first and second portions overlap the data line.

6. The liquid crystal display as recited in claim 5, further comprising at least one cutout formed in the common electrode,
   wherein the at least one cutout is aligned with a space between the second portion of the pixel electrode and the first portion of the adjacent pixel electrode.

7. The liquid crystal display as recited in claim 6, wherein a width of the cutout is wider than a width of the space between the second portion of the pixel electrode and the first portion of the adjacent pixel electrode 8. The liquid crystal display as recited in claim 2, further comprising at least one cutout formed in the common electrode,
   wherein the at least one cutout is aligned with a space between the second portion of the pixel electrode and the first portion of the adjacent pixel electrode.

9. The liquid crystal display as recited in claim 1, wherein the data line is interposed between the first and second portions of the pixel.

10. The liquid crystal display as recited in claim 9, further comprising at least one cutout formed in the common electrode,
    wherein the at least one cutout is aligned with a space between the second portion of the pixel electrode and the first portion of the adjacent pixel electrode.

11. The liquid crystal display as recited in claim 10, wherein the first and second portions overlap the data line.

12. The liquid crystal display as recited in claim 10, wherein the transistors are symmetrically disposed with respect to the data line direction.

13. The liquid crystal display as recited in claim 12, wherein a pair of the transistors includes the at least one gate electrode, at least one source electrode, at least two drain electrodes and at least one semiconductor island.

14. The liquid crystal display as recited in claim 13, wherein a width of the cutout is wider than a width of the space between the second portion of the pixel electrode and the first portion of the adjacent pixel electrode.

* * * * *

UNITED STATES PATENT AND TRADEMARK OFFICE
CERTIFICATE OF CORRECTION

PATENT NO. : 7,872,700 B2
APPLICATION NO. : 11/433319
DATED : January 18, 2011
INVENTOR(S) : Dong-Gyu Kim Page 1 of 1

It is certified that error appears in the above-identified patent and that said Letters Patent is hereby corrected as shown below:

TITLE PAGE:

(30) Foreign Application Priority Data

"2003-003841" should read --2003-0031841--

Signed and Sealed this
Fifth Day of March, 2013

Teresa Stanek Rea
*Acting Director of the United States Patent and Trademark Office*